(No Model.)  2 Sheets—Sheet 1.
L. M. CHORIER.
COMB MAKING MACHINE.
No. 311,060. Patented Jan. 20, 1885.
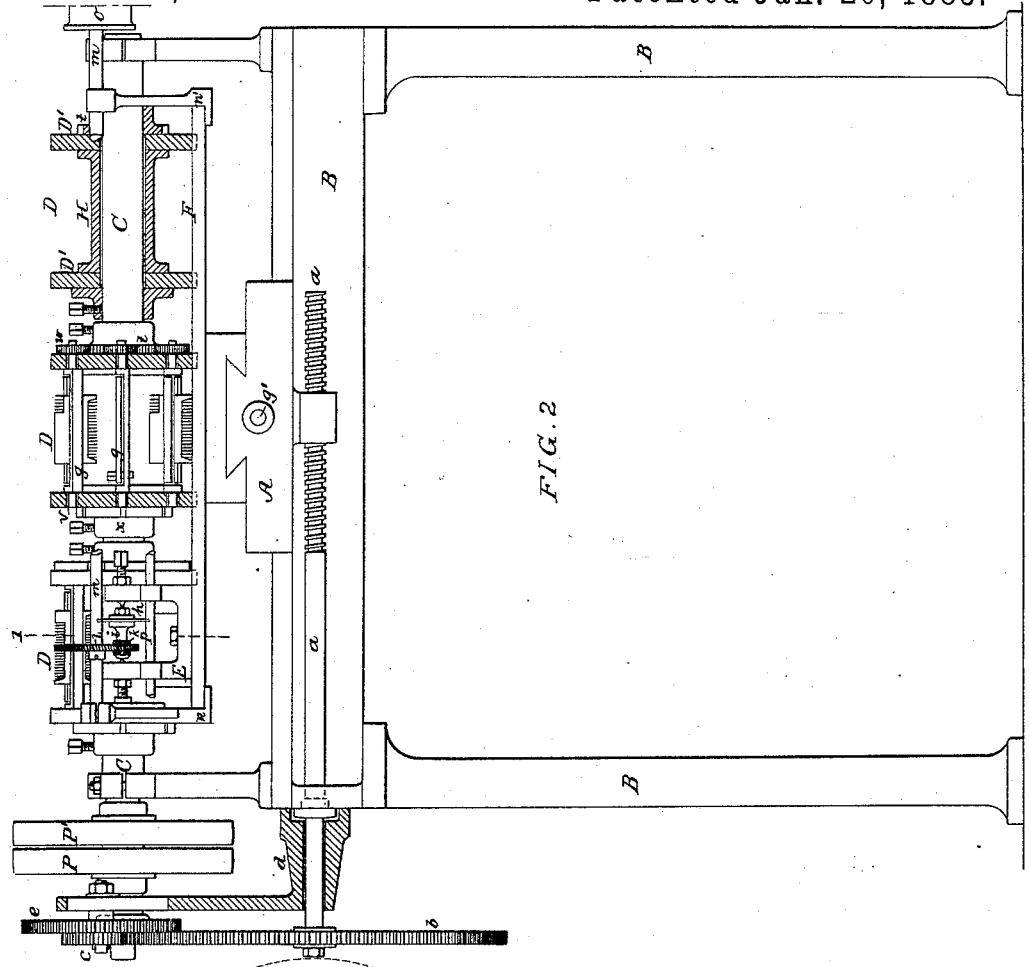
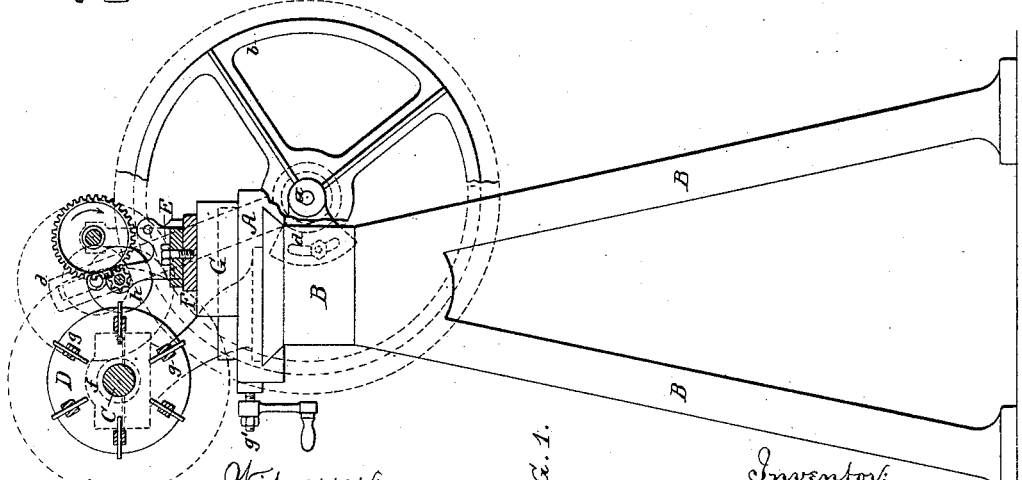
Witnesses:
Harry Drury
John M. Clayton
Inventor:
Louis M. Chorier
by his Attorneys
Howson & Sons (No Model.) 2 Sheets—Sheet 2.
L. M. CHORIER.
COMB MAKING MACHINE.
No. 311,060. Patented Jan. 20, 1885.
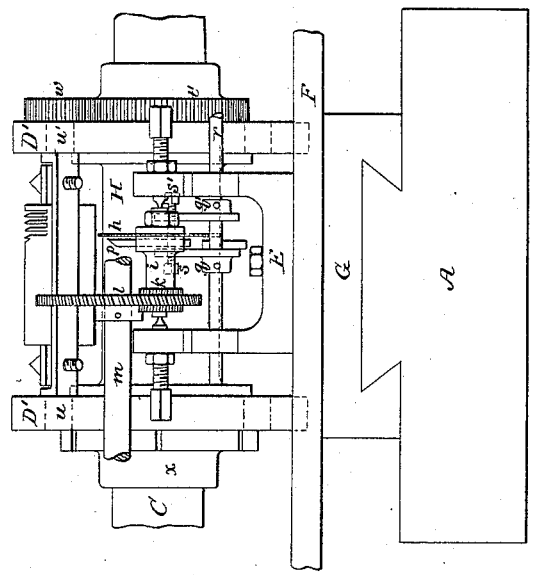
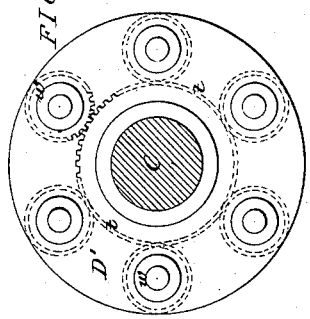
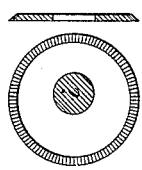
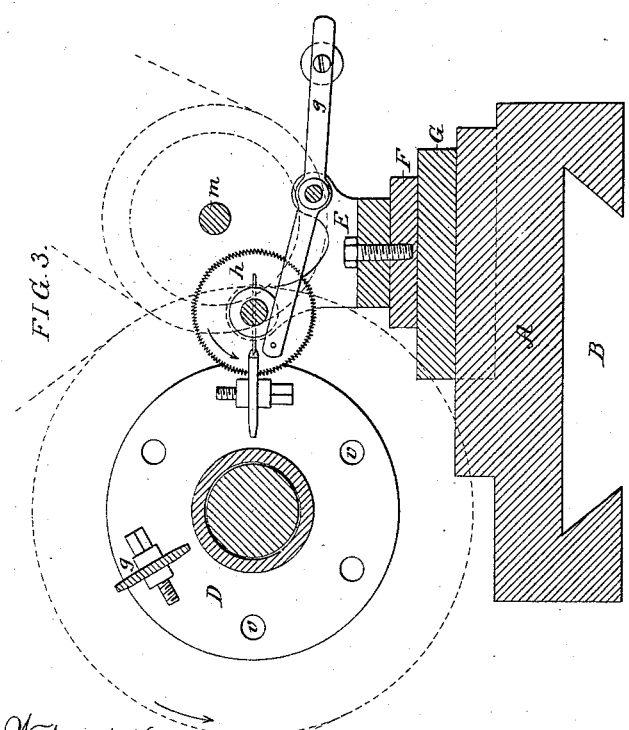
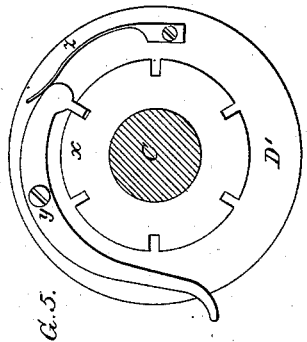
Witnesses:
Harry Drury
John M. Clayton
Inventor:
Louis M. Chorier
by his Attorneys
Howsm & Sons ly low resolution image# UNITED STATES PATENT OFFICE.

LOUIS MARIE CHORIER, OF PARIS, FRANCE.

COMB-MAKING MACHINE.

SPECIFICATION forming part of Letters Patent No. 311,060, dated January 20, 1885.

Application filed December 10, 1883. (No model.) Patented in France November 6, 1883, No. 158,395; in England November 15, 1883, No. 5,386; in Germany February 19, 1884, No. 28,039, and in Belgium May 15, 1884, No. 65,164.

*To all whom it may concern:*

Be it known that I, LOUIS MARIE CHORIER, a citizen of the Republic of France, and residing in Paris, France, have invented a certain Improved Machine for Making Combs, (for which I have obtained French Patent No. 158,395, dated November 6, 1883; British Patent No. 5,386, dated November 15, 1883; German Patent No. 28,039, dated February 19, 1884, and in Belgium Patent No. 65,164, dated May 15, 1884,) of which the following is a specification.

My invention consists of an improved machine for cutting out the teeth of combs, designed with the view of insuring regularity in the formation of the teeth and economy of manufacture.

One of the main features of my machine consists in imparting a continuous feed-motion to the carriage supporting the rotary cutters and mounting the comb-holders on a rotating drum, so that the spacing of the teeth is effected by the traverse of the cutter, which, as the drum revolves, describes on the cylinder of revolution generated by the combs a helicoidal curve. This curved line, or, in other words, pitch of the helix, intersects the combs at successive uniform points, and thus causes the teeth to be cut of uniform size.

Another feature of my machine is the provision of means for beveling the ends of the teeth as they are cut.

In the accompanying drawings, Figure 1 is an end view, partly in section, of my machine. Fig. 2 is a front elevation with parts shown in section. Fig. 3 is a sectional view drawn to an enlarged scale, illustrating a comb carrier, cutter, and guides. Fig. 4 is a front view of the same parts. Figs. 5 and 6 are views of the opposite ends of the comb-carrying drum, and Fig. 7 illustrates a modified form of cutter for beveling the ends of the teeth of the comb.

The cutter-carrier A, mounted on the table of the bench B, is worked by the screw $a$, on the end of which is fixed the toothed wheel $b$, communicating motion to one of the intermediate wheels, $c$, (the common axis of which is fixed in the bracket $d$,) the other intermediate wheel, $e$, gearing with the pinion $f$, fixed on the shaft C of the drums. Each drum D— three in the present instance—carrying the comb-holders $g$, (the particular arrangement of which I will hereinafter describe,) is carried by the shaft C, supported by standards, and on which are mounted a fast and loose pulley, P P'. Each cutter $h$ is mounted on a shaft, $i$, turning on two pointed screws fixed to a support, E, which is mounted on a bar, F, fixed on the carriage G. This carriage can be moved in or out by the handled screw $g'$, to regulate the invariable position of the cutter for each depth of teeth determined. A movement of rapid rotation is communicated to the cutter by means of the pinion $k$ on the axle $i$, and the toothed wheel $l$ on a shaft $m$, which is supported by two standards, $n\ n'$, fixed on the bar F, and consequently participating in the traversing movement of the carrier. A driving-pulley, $o$, is fixed on the shaft $m$. The wheel $l$ and the pinion $k$ have oblique teeth. A small blade, $p$, is fixed as near the cutter as possible in a recess in the axle $i$ by means of a set-screw, allowing it to be fixed in any suitable position. By this arrangement at the same time that the cutter $h$ will saw a tooth the blade $p$ will prepare the point of the next tooth. The comb represented in Fig. 4 shows an enlarged view of a finished tooth and of the beveled notch prepared for the point of the next tooth to be sawed. Two counterpoised guides, $q\ q'$, placed on each side of the cutter and mounted on the shaft $r$ in the support E, prevent the vibration of the cutter by means of two screws, $s\ s'$, which press lightly on the cutter. This arrangement is to be found in existing machines. Instead of the cutter $p$, which prepares the point of the tooth, I can dispose on the shaft $i$ a beveled disk, preferably eccentrically, as shown in Fig. 7. Each "drum" (properly so called) D, formed by the combination of the disks D' and the nave H, is loose on the main shaft C, as shown in Fig. 2. It is flanked on one side by a toothed wheel, $t$, fixed to the shaft C, and on the side by a notched disk, $x$, also fixed to the shaft. The comb holders or clamps $g$ have trunnions $u\ u'$, inserted in holes $v$, formed for this purpose in the disks D'. Pinions $w$, gearing with the toothed wheel $t$, are fixed in the trunnions $u'$, Fig. 6. If, then, keeping stationary the shaft C, the drum D is caused to revolve, the toothed wheel $t$, made stationary with the shaft, will communicate, through the pinions $w$ a movement of rotation to the comb-holders. The disk $x$, Fig. 5, on the main shaft C, at the opposite end of the drum, has in its circumference notches in which the end of a toothed catch, $y$, pivoted to the disk D' and pressed upon by a spring, $z$, can successively enter. When the catch is engaged in a notch, the drum D will be secured to the shaft C, in the movement of rotation of which it will participate. If, then, the catch be disengaged and the drum (thus become again loose on the shaft) turned so far as to bring the tooth of the catch into the next succeeding notch, this movement of the drum will have determined the rotation of a half-turn of the comb-holders, (the pinions $w$ having been calculated for this purpose according to the numbers of the divisions of the disk $x$ corresponding to the number of comb-holders in each drum,) thereby bringing the combs into the new position desired.

In the drawings I have illustrated the machine as provided with three comb-carrying drums and three cutters and attachments; but the number may be varied without departing from my invention. The comb-blanks having been secured in the several clamps or holders in the drums D, the cutters are set in rapid rotary motion from the pulley $o$, and the drums with the blanks are rotated slowly. The blanks are thus successively brought into contact with corresponding cutters, and the feed-screw $a$, slowly traversing the carrier A, will have caused each cutter to move the width of a tooth at each revolution of the drum. When the teeth have been cut in this manner on one side of the blanks, the catches $y$ are released, and the blanks reversed for a repetition of the operation on their opposite edges.

I claim as my invention—

1. The combination of a rotary drum carrying a series of clamps for comb-blanks, a carrier and feed-screw to impart a continuous feed-motion to the carrier alongside the drum, with a rotary cutter, and a driving-shaft for said cutter, both mounted on the carrier, substantially as described, whereby a continuous feed is imparted to the carrier alongside the drum as the latter is rotated.

2. The combination of a series of rotary comb-carrying drums with a traversing-carrier alongside the drums, and having a series of rotary cutters and gearing, and a driving-shaft mounted on the carrier to impart motion to the cutters, substantially as set forth.

3. The combination of a comb-carrying drum with a rotary cutter alongside the drum to cut out the teeth of the comb-blanks, and a beveled cutter adjacent to the cutter to bevel the ends of the said teeth, substantially as specified.

4. The combination of a shaft, a drum, D, loose on the shaft, and a series of comb-holders, having trunnions mounted in said drum, and having pinions at one end, with a gear-wheel secured to the shaft, and gearing into said pinions, a notched wheel also secured to the shaft, and a catch carried by the drum, substantially as set forth.

In testimony whereof I have signed my name to this specification in the presence of two subscribing witnesses.

LOUIS MARIE CHORIER.

Witnesses:
LÉON FRANCKEN,
ROBT. M. HOOPER.